US008039562B2

(12) United States Patent
Pannell et al.

(10) Patent No.: US 8,039,562 B2
(45) Date of Patent: Oct. 18, 2011

(54) METHOD FOR SEED BED TREATMENT BEFORE A POLYMERIZATION REACTION

(75) Inventors: Richard B. Pannell, Kingwood, TX (US); Eric J. Markel, Kingwood, TX (US); Agapios K. Agapiou, Humble, TX (US)

(73) Assignee: Univation Technologies, LLC, Houston, TX (US)

( * ) Notice: Subject to any disclaimer, the term of this patent is extended or adjusted under 35 U.S.C. 154(b) by 367 days.

(21) Appl. No.: 12/322,143

(22) Filed: Jan. 29, 2009

(65) Prior Publication Data

US 2009/0198025 A1    Aug. 6, 2009

Related U.S. Application Data

(63) Continuation of application No. 11/236,998, filed on Sep. 28, 2005, now abandoned, and a continuation-in-part of application No. 11/011,421, filed on Dec. 14, 2004, now abandoned.

(60) Provisional application No. 60/534,026, filed on Jan. 2, 2004.

(51) Int. Cl.
*C08F 2/00* (2006.01)
*C08F 210/00* (2006.01)
(52) U.S. Cl. ............... 526/64; 526/74; 526/348; 526/89
(58) Field of Classification Search .................. 526/64, 526/74, 89, 348
See application file for complete search history.

(56) References Cited

U.S. PATENT DOCUMENTS 3,221,002 A   11/1965   Adam et al.
3,487,112 A   12/1969   Paulik et al.
(Continued)

FOREIGN PATENT DOCUMENTS

CN    1178222 A    4/2001
(Continued)

OTHER PUBLICATIONS

Britovsek et al., "Novel olefin polymerization catalysts based on iron and cobalt," Chem. Commun., 1998, pp. 849-850.
Johnson et al., "Copolymerization of Ethylene and Propylene with Functionalized Vinyl Monomers by Palladium(II) Catalysts", J. Am. Chem. Soc., 1996, 118, 267-268.

(Continued)

*Primary Examiner* — William Cheung (57) ABSTRACT

In some embodiments, a method in which at least one continuity additive ("CA") and a seed bed are pre-loaded into a reactor, and a polymerization reaction is optionally then performed in the reactor. In other embodiments, at least one flow improver, at least one CA, and a seed bed are pre-loaded into a reactor. Pre-loading of a reactor with a CA can significantly improve continuity of a subsequent polymerization reaction in the reactor during its initial stages, including by reducing sheeting and fouling. The CA can be pre-loaded in dry form (e.g., as a powder), or in liquid or slurry form (e.g., as an oil slurry). To aid delivery of a dry CA to the reactor and combination of the dry CA with a seed bed in the reactor, the dry CA can be combined with a flow improver and the combination of CA and flow improver then loaded into the reactor. Alternatively, the CA and flow improver can be sequentially loaded into the reactor, and then mixed together (and mixed with a seed bed) in the reactor after both the CA and flow improver have been separately loaded into the reactor.

51 Claims, 3 Drawing Sheets

U.S. PATENT DOCUMENTS

| | | | |
|---|---|---|---|
| 3,687,920 A | 8/1972 | Johnson | |
| 4,012,574 A | 3/1977 | Jones et al. | |
| 4,077,904 A | 3/1978 | Noshay et al. | |
| 4,086,408 A | 4/1978 | Karol et al. | |
| 4,101,445 A | 7/1978 | Levine et al. | |
| 4,115,639 A | 9/1978 | Brown et al. | |
| 4,124,532 A | 11/1978 | Giannini et al. | |
| 4,182,814 A | 1/1980 | Bernemann et al. | |
| 4,302,565 A | 11/1981 | Goeke et al. | |
| 4,302,566 A | 11/1981 | Karol et al. | |
| 4,306,044 A | 12/1981 | Charsley et al. | |
| 4,376,062 A | 3/1983 | Hamer et al. | |
| 4,376,191 A | 3/1983 | Geck et al. | |
| 4,379,758 A | 4/1983 | Wagner et al. | |
| 4,472,559 A | 9/1984 | Maehara et al. | |
| 4,482,687 A | 11/1984 | Noshay et al. | |
| 4,532,311 A | 7/1985 | Fulks et al. | |
| 4,560,671 A | 12/1985 | Gross et al. | |
| 4,564,605 A | 1/1986 | Collomb Ceccarini et al. | |
| 4,689,437 A | 8/1987 | Murray | |
| 4,719,193 A | 1/1988 | Levine et al. | |
| 4,721,763 A | 1/1988 | Bailly et al. | |
| 4,755,495 A | 7/1988 | Cann et al. | |
| 4,810,397 A | 3/1989 | Dvoracek et al. | |
| 4,855,370 A | 8/1989 | Chirillo et al. | |
| 4,879,359 A | 11/1989 | Chamla et al. | |
| 4,960,741 A | 10/1990 | Bailly et al. | |
| 4,978,722 A | 12/1990 | Goko et al. | |
| 5,019,633 A | 5/1991 | Wagner et al. | |
| 5,026,795 A | 6/1991 | Hogan et al. | |
| 5,034,480 A | 7/1991 | Funk et al. | |
| 5,034,481 A | 7/1991 | Funk et al. | |
| 5,055,438 A | 10/1991 | Canich | |
| 5,057,475 A | 10/1991 | Canich et al. | |
| 5,064,802 A | 11/1991 | Stevens et al. | |
| 5,066,736 A | 11/1991 | Dumain et al. | |
| 5,066,737 A | 11/1991 | Job | |
| 5,070,055 A | 12/1991 | Schramm et al. | |
| 5,093,415 A | 3/1992 | Brady, III et al. | |
| 5,096,867 A | 3/1992 | Canich | |
| 5,126,414 A | 6/1992 | Cooke et al. | |
| 5,145,819 A | 9/1992 | Winter et al. | |
| 5,198,401 A | 3/1993 | Turner et al. | |
| 5,227,440 A | 7/1993 | Canich et al. | |
| 5,233,049 A | 8/1993 | Dinan et al. | |
| 5,239,022 A | 8/1993 | Winter et al. | |
| 5,243,001 A | 9/1993 | Winter et al. | |
| 5,264,405 A | 11/1993 | Canich | |
| 5,276,208 A | 1/1994 | Winter et al. | |
| 5,296,434 A | 3/1994 | Karl et al. | |
| 5,304,614 A | 4/1994 | Winter et al. | |
| 5,317,036 A | 5/1994 | Brady, III et al. | |
| 5,321,106 A | 6/1994 | LaPointe | |
| 5,329,031 A | 7/1994 | Miyake et al. | |
| 5,332,706 A | 7/1994 | Nowlin et al. | |
| 5,410,002 A | 4/1995 | Govoni et al. | |
| 5,427,991 A | 6/1995 | Turner | |
| 5,461,123 A | 10/1995 | Song et al. | |
| 5,473,028 A | 12/1995 | Nowlin et al. | |
| 5,492,975 A | 2/1996 | Peifer et al. | |
| 5,527,752 A | 6/1996 | Reichle et al. | |
| 5,539,124 A | 7/1996 | Etherton et al. | |
| 5,554,775 A | 9/1996 | Krishnamurti et al. | |
| 5,610,244 A | 3/1997 | Govoni et al. | |
| 5,627,243 A | 5/1997 | H am al ainen et al. | |
| 5,637,660 A | 6/1997 | Nagy et al. | |
| 5,643,847 A | 7/1997 | Walzer, Jr. | |
| 5,661,095 A | 8/1997 | Meverden et al. | |
| 5,677,401 A | 10/1997 | Kataoka et al. | |
| 5,723,398 A | 3/1998 | Rosen et al. | |
| 5,731,392 A | 3/1998 | Ali et al. | |
| 5,744,417 A | 4/1998 | Nagy et al. | |
| 5,747,406 A | 5/1998 | Reichle et al. | |
| 5,753,578 A | 5/1998 | Santi et al. | |
| 5,756,611 A | 5/1998 | Etherton et al. | |
| 5,763,723 A | 6/1998 | Reagen et al. | |
| 5,849,655 A | 12/1998 | Shamshoum et al. | |
| 5,851,945 A | 12/1998 | Turner et al. | |
| 5,852,143 A | 12/1998 | Sishta et al. | |
| 5,852,144 A | 12/1998 | Badley | |
| 5,852,145 A | 12/1998 | McLain et al. | |
| 5,852,146 A | 12/1998 | Reichle et al. | |
| 5,854,164 A | 12/1998 | Shiraishi et al. | |
| 5,854,363 A | 12/1998 | Jung et al. | |
| 5,856,258 A | 1/1999 | Marks et al. | |
| 5,856,547 A | 1/1999 | Jung et al. | |
| 5,858,903 A | 1/1999 | Sylvester et al. | |
| 5,859,158 A | 1/1999 | Mukaiyama et al. | |
| 5,866,663 A | 2/1999 | Brookhart et al. | |
| 5,869,585 A | 2/1999 | Mink et al. | |
| 5,880,241 A | 3/1999 | Brookhart et al. | |
| 5,929,266 A | 7/1999 | Jones et al. | |
| 6,008,662 A | 12/1999 | Newton et al. | |
| 6,103,357 A | 8/2000 | Selinder et al. | |
| 6,103,620 A | 8/2000 | Kim | |
| 6,111,034 A | 8/2000 | Goode et al. | |
| 6,245,868 B1 | 6/2001 | Agapiou et al. | 526/88 |
| 6,300,436 B1 | 10/2001 | Agapiou et al. | 526/154 |
| 6,306,984 B1 | 10/2001 | Agapiou et al. | 526/154 |
| 6,335,402 B1 | 1/2002 | Mihan et al. | |
| 6,482,903 B1 | 11/2002 | Agapiou et al. | 526/130 |
| 6,660,815 B2 | 12/2003 | Agapiou et al. | 526/130 |
| 6,831,140 B2 | 12/2004 | Muhle et al. | |
| 7,985,811 B2 | 7/2011 | Hagerty et al. | |
| 2002/0103072 A1 | 8/2002 | Patrick et al. | |
| 2003/0229186 A1 | 12/2003 | Mawson et al. | |
| 2004/0132931 A1 | 7/2004 | Muhle et al. | |
| 2005/0148742 A1 | 7/2005 | Hagerty et al. | |
| 2007/0073012 A1 | 3/2007 | Pannell et al. | |

FOREIGN PATENT DOCUMENTS

| | | |
|---|---|---|
| EP | 0416815 A2 | 3/1991 |
| EP | 0420436 A1 | 4/1991 |
| EP | 0453116 | 10/1991 |
| EP | 0549252 A1 | 6/1993 |
| EP | 0560035 | 9/1993 |
| EP | 0578838 A | 1/1994 |
| EP | 0638595 A | 2/1995 |
| EP | 0513380 | 10/1997 |
| EP | 0811638 A2 | 12/1997 |
| EP | 0816372 A1 | 1/1998 |
| EP | 0816384 A2 | 1/1998 |
| EP | 0735057 B1 | 5/1998 |
| EP | 0839834 A2 | 5/1998 |
| EP | 0632819 B1 | 9/1998 |
| EP | 0757996 B1 | 9/1998 |
| EP | 0874005 A1 | 10/1998 |
| EP | 0748821 B1 | 11/1998 |
| EP | 1308464 | 5/2003 |
| EP | 1699830 | 6/2010 |
| GB | 2105355 | 3/1983 |
| WO | WO 91/04257 | 4/1991 |
| WO | WO 92/00333 | 1/1992 |
| WO | WO 93/08199 | 4/1993 |
| WO | WO 93/08221 | 4/1993 |
| WO | WO 94/03506 | 2/1994 |
| WO | WO 94/07928 | 4/1994 |
| WO | WO 95/07140 | 3/1995 |
| WO | WO 96/00244 | 1/1996 |
| WO | WO 96/08520 | 3/1996 |
| WO | WO 96/11961 | 4/1996 |
| WO | WO 96/23010 | 8/1996 |
| WO | WO 96/33202 | 10/1996 |
| WO | WO 96/34021 | 10/1996 |
| WO | WO 97/06186 | 2/1997 |
| WO | WO 97/14721 | 4/1997 |
| WO | WO 97/15602 | 5/1997 |
| WO | WO 97/17379 | 5/1997 |
| WO | WO 97/27224 | 7/1997 |
| WO | WO 97/46599 | 12/1997 |
| WO | WO 97/48735 | 12/1997 |
| WO | WO 98/11144 | 3/1998 |
| WO | WO 98/12231 | 3/1998 |
| WO | WO 98/22486 | 5/1998 |
| WO | WO 98/41529 | 9/1998 |
| WO | WO 98/41530 | 9/1998 |
| WO | WO 98/42664 | 10/1998 |

| | | |
|---|---|---|
| WO | WO 98/46650 | 10/1998 |
| WO | WO 98/46651 | 10/1998 |
| WO | WO 99/01481 | 1/1999 |
| WO | WO 99/02540 | 1/1999 |
| WO | WO 99/14221 | 3/1999 |
| WO | WO 99/61486 | 12/1999 |
| WO | WO 00/002931 | 1/2000 |
| WO | WO 01/44323 | 6/2001 |
| WO | WO 02/40554 | 5/2002 |
| WO | WO 02/40554 A1 * | 5/2002 |
| WO | WO 2005/006807 | 1/2005 |
| WO | WO 2005/068507 A1 * | 7/2005 |
| WO | WO 2005/113610 | 12/2005 |

OTHER PUBLICATIONS

Johnson et al., "New Pd(II)-and Ni(II)-Based Catalysts for Polymerization of Ethylene and a-Olefins", J. Am. Chem. Soc. 1995, 117, 6414-6415.

Scollard et al., "Sterically Demanding Diamide Ligands: Synthesis and Structure of Zirconium Alkyl Derivatives," Organometallics, 1995, 14, 5478-5480.

* cited by examiner

METHOD FOR SEED BED TREATMENT BEFORE A POLYMERIZATION REACTION

CROSS REFERENCE TO RELATED APPLICATIONS

This application is a Continuation of Ser. No. 11/236,998, filed Sep. 28, 2005 (now abandoned); and Continuation-in-Part of Ser. No. 11/011,421, filed Dec. 14, 2004 (now abandoned), which claims the benefit of Ser. No. 60/534,026, filed Jan. 2, 2004; the disclosures of which are herein incorporated by reference in their entireties.

FIELD OF THE INVENTION

The invention pertains to methods for seed bed treatment before performance of a polymerization reaction (e.g., an olefin polymerization reaction) to improve continuity of the reaction.

BACKGROUND OF THE INVENTION

One commonly used method for producing polymers is gas phase polymerization. During operation to produce polyolefins by polymerization, a conventional gas phase fluidized bed reactor contains a fluidized dense-phase bed including a mixture of reaction gas, polymer (resin) particles, catalyst, and catalyst modifiers. Before such a polymerization reaction, a "seed bed" is typically loaded into the reactor or is present in the reactor from a previous polymerization operation. The seed bed is (or consists essentially of) granular material that is or includes polymer material. The polymer material can but need not be identical to the desired end product of the reaction. An example of seed bed material is metallocene polyethylene.

It is known to introduce a continuity additive ("CA") into a reactor during a fluidized bed polymerization reaction to reduce sheeting and/or fouling in the reactor during polymerization. Such use of a continuity additive, optionally with a flow improver, is described in U.S. Pat. No. 6,482,903, issued Nov. 19, 2002; U.S. Pat. No. 6,660,815, issued Dec. 9, 2003; U.S. Pat. No. 6,306,984, issued Oct. 23, 2001; and U.S. Pat. No. 6,300,436, issued Oct. 9, 2001, all assigned to the assignee of the present invention. A continuity additive is typically not catalytic, but is typically combined with a catalyst (and typically also with a flow improver) before or after being introduced into the reactor. Examples of CAs are aluminum stearate, other metal stearates, and Atmer AS 990 (an ethoxylated stearyl amine, available from Ciba Specialty Chemicals Co, Basel, Switzerland).

U.S. Pat. No. 6,300,436 and U.S. Pat. No. 6,306,984 describe an olefin polymerization process (e.g., a gas phase or slurry phase process) in a reactor the presence of a catalyst composition comprising a carboxylate metal salt. The carboxylate metal salt is a continuity additive ("CA") which significantly reduces sheeting and/or fouling in the reactor during polymerization. The catalyst composition is produced by combining, contacting, blending and/or mixing a catalyst system (e.g., a supported catalyst system) with the carboxylate metal salt. The catalyst system can be a transition metal catalyst compound (e.g., a bulky ligand metallocene-type catalyst compound). The carboxylate metal salt can be blended (e.g., tumble dry blended) with a supported catalyst system or polymerization catalyst comprising a carrier. The polymerization catalyst can be dry and free flowing and the metal carboxylate salt mixed or blended with the catalyst can be in solid form. Alternatively, the carboxylate metal salt is added to a reactor (containing reactants and a catalyst system) during polymerization without previously having been combined, blended, contacted, or mixed with the catalyst system.

U.S. Pat. No. 6,300,436, U.S. Pat. No. 6,306,984, and U.S. Pat. No. 6,482,903 teach that carboxylate metal salts that may be suitable for use as continuity additives are any mono- or di- or tri-carboxylic acid salt with a metal portion from the Periodic Table of Elements. Examples include saturated, unsaturated, aliphatic, aromatic or saturated cyclic carboxylic acid salts where the carboxylate ligand has preferably from 2 to 24 carbon atoms, such as acetate, propionate, butyrate, valerate, pivalate, caproate, isobuytlacetate, t-butyl-acetate, caprylate, heptanate, pelargonate, undecanoate, oleate, octoate, palmitate, myristate, margarate, stearate, arachate and tercosanoate. Examples of the metal portion includes a metal from the Periodic Table of Elements selected from the group of Al, Mg, Ca, Sr, Sn, Ti, V, Ba, Zn, Cd, Hg, Mn, Fe, Co, Ni, Pd, Li and Na.

Examples of carboxylate metal salts that may be suitable for use as continuity additives are represented by the general formula $M(Q)_x(OOCR)_y$, where M is a metal from Groups 1 to 16 and the Lanthanide and Actinide series, preferably from Groups 1 to 7 and 13 to 16 (preferably Groups 2 and 13, and most preferably Group 13); Q is a halogen or hydrogen, or a hydroxy, hydroxide, alkyl, alkoxy, aryloxy, siloxy, silane sulfonate group, or siloxane; R is a hydrocarbyl radical having from 2 to 100 carbon atoms, preferably 4 to 50 carbon atoms; and x is an integer from 0 to 3 and y is an integer from 1 to 4 and the sum of x and y is equal to the valence of the metal. In a preferred embodiment of the above formula, y is an integer from 1 to 3, preferably 1 to 2, especially where M is a Group-13 metal.

Non-limiting examples of R in the above formula include hydrocarbyl radicals having 2 to 100 carbon atoms that include alkyl, aryl, aromatic, aliphatic, cyclic, saturated or unsaturated hydrocarbyl radicals. For example, R can be a hydrocarbyl radical having greater than or equal to 8 carbon atoms (preferably greater than or equal to 17 carbon atoms) or R can be a hydrocarbyl radical having from 17 to 90 carbon atoms (preferably from 17 to 54 carbon atoms).

Non-limiting examples of Q in the above formula include one or more, same or different, hydrocarbon containing group such as alkyl; cycloalkyl, aryl, alkenyl, arylalkyl, arylalkenyl or alkylaryl, alkylsilane, arylsilane, alkylamine, arylamine, alkyl phosphide, alkoxy having from 1 to 30 carbon atoms. The hydrocarbon containing group may be linear, branched, or even substituted. For example, Q can be an inorganic group such as a halide, sulfate or phosphate.

For some applications, a carboxylate metal salt employed as a CA has a melting point from about 30° C. to about 250° C. (preferably from about 100° C. to about 200° C.). For some applications, the carboxylate metal salt employed as a CA is an aluminum stearate having a melting point in the range of from about 135° C. to about 65° C. For typical applications, the carboxylate metal salt employed as a CA has a melting point greater than the polymerization temperature in the reactor.

Other examples of carboxylate metal salts that may be suitable for use as continuity additives include titanium stearates, tin stearates, calcium stearates, zinc stearates, boron stearates and strontium stearates.

For some applications, a carboxylate metal salt is combined (for use as a continuity additive) with an antistatic agent such as a fatty amine, for example, Atmer AS 990/2 zinc additive, a blend of ethoxylated stearyl amine and zinc stearate, or Atmer AS 990/3, a blend of ethoxylated stearyl amine, zinc stearate and octadecyl-3,5-di-tert-butyl-4-hydroxyhydrocinnamate. Both the AS 990/2 and 990/3 blends are available from Crompton Corporation of Memphis, Tenn.

U.S. Pat. Nos. 6,482,903 and 6,660,815 teach performance of an olefin polymerization process (e.g., a gas phase or slurry phase process) in a reactor in the presence of a catalyst composition including a catalyst system (e.g., a supported bulky ligand metallocene-type catalyst system), at least one carboxylate metal salt, and at least one flow improver. The flow improver can be a colloidal particulate material (e.g., Snowtex colloidal silica, available from Nissan Chemical Industries, Tokyo, Japan, or another colloidal silica). Other examples of the flow improver that are disclosed in U.S. Pat. No. 6,482,903 include a colloidal silica (e.g., Cabosil, available from Cabot), a fumed silica, a syloid, and alumina. U.S. Pat. Nos. 6,482,903 and 6,660,815 teach that the carboxylate metal salt is preferably contacted with the flow improver prior to use in the reactor or contact with a polymerization catalyst, and that a catalyst system can be combined, contacted, blended, or mixed with a composition of at least one carboxylate metal salt and at least one flow improver before use in a reactor.

U.S. Pat. Nos. 6,482,903 and 6,660,815 also teach that because carboxylate metal salts are difficult to handle (e.g., because their morphology is poor and because they have low bulk density and fluffy consistency), a combination of a carboxylate metal salt and a flow improver can be handled and combined with a supported catalyst system in a substantially improved manner than can the carboxylate metal salt alone.

U.S. Pat. Nos. 6,300,436 and 6,306,984 teach that when starting up a polymerization reaction, especially a gas phase process, there is a higher tendency for operability problems to occur. They also teach performing the initial stages of such a reaction (before the process has stabilized) in the presence of a polymerization catalyst and carboxylate metal salt mixture to reduce or eliminate start-up problems. They also teach implementing a transition after the initial stages of the reaction (i.e., when the reactor has begun to operate in a stable state) to cause the reaction to proceed in the presence of the same (or a different) polymerization catalyst but not in the presence of the carboxylate metal salt.

However, the present inventors have recognized that a reactor can be vulnerable to sheeting and/or fouling during the critical initial stage(s) of a polymerization reaction (before the reaction has stabilized) even if each such initial stage is performed in the presence of a CA, if the concentration of the CA is low. The present inventors have also recognized that the concentration of CA in a reactor is typically too low to eliminate this vulnerability if the CA is introduced during the initial stage(s) of the polymerization reaction (i.e., after the reaction has begun).

Before the present invention, it had not been known how reliably to prevent sheeting and/or fouling during the critical initial stage(s) of a polymerization reaction.

SUMMARY OF THE INVENTION

In a class of embodiments of the inventive method, a continuity additive ("CA") is pre-loaded into a reactor (in which a seed bed is present and a polymerization reaction can be performed) or a mixture of a CA and a seed bed are pre-loaded into a reactor (in which a polymerization reaction can be performed). Optionally, a polymerization reaction is then performed in the reactor. In other embodiments of the inventive method, a flow improver and a CA are pre-loaded into a reactor in which a seed bed is present, or a mixture of a CA, a flow improver, and a seed bed are pre-loaded into a reactor (in which a polymerization reaction can be performed). Optionally, a polymerization reaction is then performed in the reactor. In some embodiments of the inventive method, a CA is pre-loaded into a seed bed present in a reactor from a previous polymerization operation. Optionally, a polymerization reaction is then performed in the reactor. In some embodiments of the inventive method, a CA with a flow aid is pre-loaded into a seed bed present in a reactor from a previous polymerization operation. Optionally, a polymerization reaction is then performed in the reactor.

Pre-loading of the reactor in accordance with the invention can significantly improve continuity of the polymerization reaction during at least one initial stage (before the reaction has stabilized), including by reducing sheeting and fouling. The initial stage (or stages) of a polymerization reaction are the most critical in the sense that there is typically a higher tendency for operability problems to occur before the reaction has stabilized than after it has stabilized.

Herein, the expression that a reactor (in which a polymerization reaction can be performed) is "pre-loaded" with a CA (or a combination of a CA and at least one other substance) denotes that the CA (or combination) is loaded into the reactor before the start of the polymerization reaction. Due to its function, a seed bed in a reactor is always "pre-loaded" in the reactor in the sense that it is loaded prior to and in preparation for a reaction which may or may not subsequently occur (in contrast with being loaded at or after the start of the reaction). Pre-loading in accordance with the invention is typically accomplished by loading a seed bed (typically consisting essentially of granular material) into a reactor before the start of a polymerization reaction, and then combining a CA (or a combination of a CA and at least one other substance) with the seed bed in the reactor before the start of the reaction. Alternatively, pre-loading in accordance with the invention can be accomplished by preparing treated seed bed material (by combining seed bed material with at least one CA) and then loading the treated seed bed material into the reactor before the start of a polymerization reaction, or loading a CA (or a combination of a CA and at least one other substance) into a reactor (in which a seed bed is already present) before the start of a polymerization reaction.

In a class of embodiments, the invention is a method comprising the steps of:

(a) loading a seed bed into a reactor (typically an empty reactor);

(b) loading a continuity additive ("CA"), or a combination of a CA and a flow improver, into the reactor; and (c) after steps (a) and (b), performing a polymerization reaction in the reactor.

Steps (a) and (b) can be, and typically are, performed with air and moisture present in the reactor. Typically, moisture and air are removed from the reactor (e.g., by performing a drying operation) after steps (a) and (b) but before step (c) to prepare the reactor for performance of the reaction.

In preferred embodiments in this class, pre-loading the reactor (in step (b)) with the CA or combination eliminates or significantly reduces sheeting and fouling that would otherwise occur (if the reactor were not pre-loaded with the CA or combination) during at least one initial stage of the polymerization reaction, and optionally also otherwise improves continuity during at least one initial stage of the polymerization reaction.

Alternatively, pre-loading of at least one CA in accordance with the invention can be accomplished by treating a seed bed existing in a reactor (from a previous polymerization operation) before the start of a new polymerization reaction. The seed bed can be from a polymerization reaction that used the same or a different catalyst system as the catalyst system to be employed in the new polymerization reaction.

In a class of embodiments, the invention is a method comprising the steps of:

(a) when a seed bed is present in a reactor (e.g., a seed bed remaining in the reactor from a previous polymerization operation performed in the reactor), loading a continuity additive ("CA"), or a combination of a CA and a flow improver, into the reactor; and (b) after step (a), performing a polymerization reaction in the reactor.

Typically, air and moisture are present (with the seed bed) in the reactor during step (a). Typically, the moisture and air are removed from the reactor (e.g., by performing a drying or purging operation) after step (a) but before step (b) to prepare the reactor for performance of the reaction.

In a class of preferred embodiments, a CA is pre-loaded in dry form (e.g., as a powder) into the reactor. In other preferred embodiments, the CA is pre-loaded into the reactor in liquid or slurry form (e.g., as an oil slurry) or as a component of a mixture of solids, liquids, or at least one solid and at least one liquid. For example, a solid and/or a liquid CA can be pre-loaded (in accordance with some embodiments) with a carrier liquid (e.g., a hydrocarbon or hydrocarbon oil) into a reactor. To aid delivery of a dry CA to a reactor and combination of the dry CA with a seed bed in the reactor, the dry CA can be combined with a flow improver and the combination of CA and flow improver then loaded into the reactor. Alternatively, a CA and a flow improver can be sequentially loaded into the reactor, and then mixed together (and mixed with a seed bed) in the reactor after both the CA and flow improver have been separately loaded into the reactor. The improved flow properties of the combined CA and flow improver allow for delivery of the CA as a solid (e.g., to pre-load the reactor with a specific, predetermined amount of CA for smooth start up operation).

In typical embodiments, a specific amount of CA is pre-loaded into a reactor based on the weight of a seed bed in (or to be loaded into) the reactor. In general, embodiments of the invention can include any of the steps of: pre-loading a CA into a reactor and then loading a seed bed into the reactor; loading a seed bed into a reactor and then pre-loading a CA into the reactor; simultaneously pre-loading a CA and a seed bed into a reactor; and combining (e.g., mixing) a seed bed with a CA and then loading the combination into a reactor. In any of these embodiments, the CA may be loaded (e.g., pre-loaded) with a flow aid.

In various embodiments of the invention, a CA is pre-loaded into a reactor in any of a number of different ways, including by:

pretreatment of a seedbed in the reactor with a flow-aid modified CA;

introduction of the CA with (and during) loading of a seed bed into the reactor (for example, the seed bed material can be combined with the CA before the combination is loaded into the reactor);

introduction of the CA during the reactor condition build-up stage after purging is complete;

introduction of the CA directly into the seed bed via a tube inserted into the seed bed (e.g., through a catalyst support tube);

introduction of dry CA (that has been pre-weighed) into the reactor; and introduction of dry CA (that has been pre-weighed into a metal container) into the reactor using pressurized nitrogen.

As used herein, the phrase "catalyst support tube" denotes a tube (typically a heavy walled tube) extending from about 0.1 $R_R$ to 0.6 $R_R$ into a reactor through which another tube optionally be placed, where $R_R$ is the radius of the reactor. CA may be pre-loaded in accordance with the invention either through a catalyst support tube or another tube optionally placed through the inner opening of a catalyst support tube.

DETAILED DESCRIPTION OF PREFERRED EMBODIMENTS

A system including a reactor that can be pre-loaded in accordance with the invention will be described with reference to FIG. 1. The FIG. 1 system includes fluidized bed reactor 10. Reactor 10 has a bottom end 11, a top section 19, a cylindrical (straight) section 14 between bottom end 11 and top section 19, and a distributor plate 12 within section 14. The diameter of each horizontal cross-section of section 19 is greater than the diameter of straight section 14. In operation, dense-phase surface 18 is the boundary between lean phase material present within reactor 10 (above dense-phase surface 18) and dense-phase material 16 within reactor 10 (in the volume bounded by section 14, plate 12, and surface 18). In operation, freeboard surface 20 of reactor 10 includes the inner surface of top section 19 and the portion of the inner surface of section 14 above surface 18.

Figure 1:
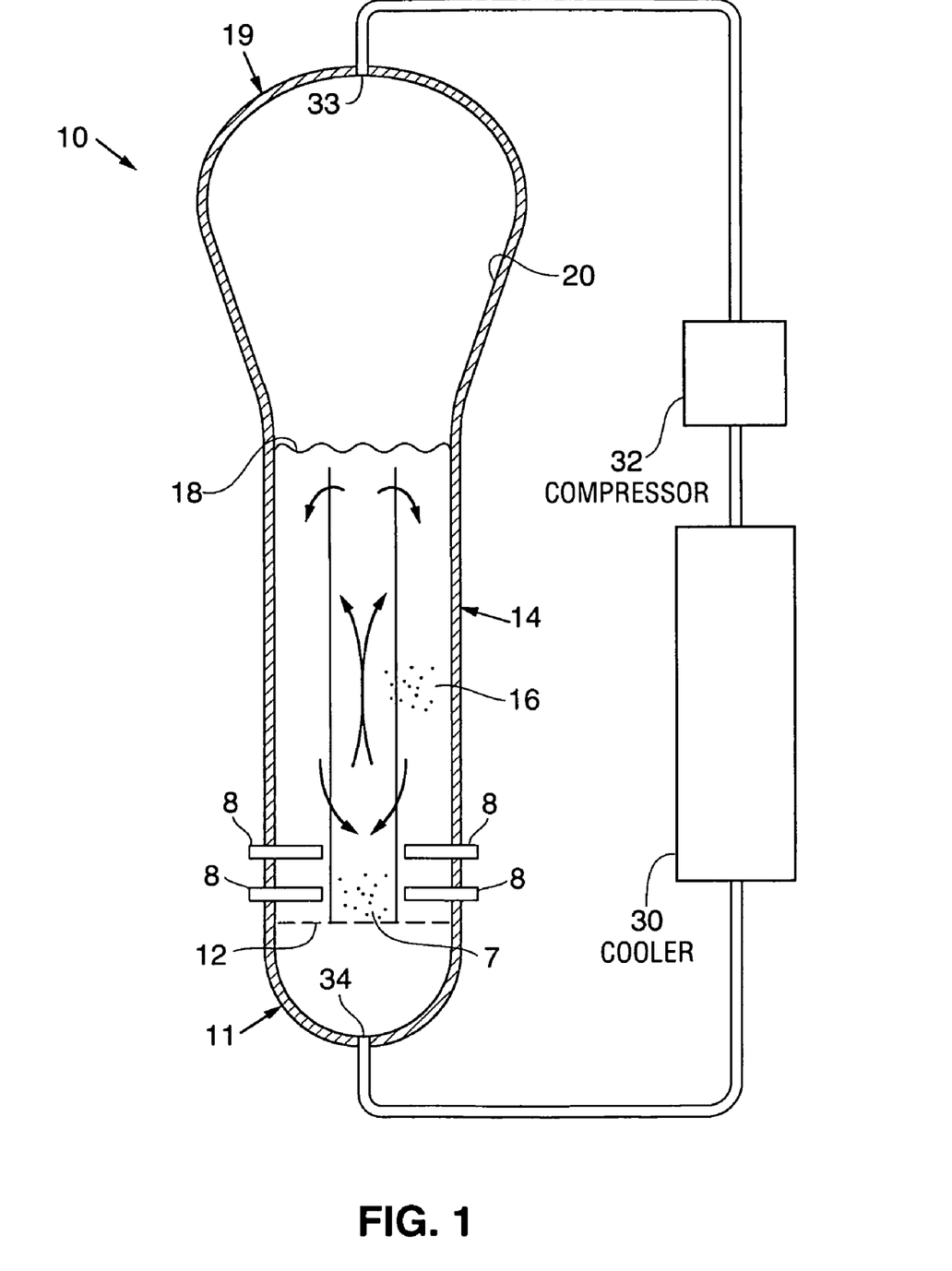
FIG. 1 is a simplified cross-sectional view of a system including fluidized bed reactor (10), which can be pre-loaded in accordance with the invention.

The FIG. 1 system also has a cooling control loop which includes circulating gas cooler 30 and compressor 32, coupled with reactor 10 as shown. During operation, the cooled circulating gas flows from cooler 30 through inlet 34 into reactor 10, then propagates upward through the bed and out from reactor 10 via outlet 33. The cooling fluid (whose temperature has increased during its flow through reactor 10) is pumped by compressor 32 from outlet 33 back to cooler 30. Temperature sensors (not shown) near the inlet and outlet of cooler 30 typically provide feedback to cooler 30 and/or compressor 32 to control the amount by which cooler 30 reduces the temperature of the fluid entering its inlet and/or flow rate through compressor 32.

Conventionally, a seed bed is pre-loaded in reactor 10 before the start of a polymerization reaction therein. The seed bed typically consists essentially of granular material. At the start of the polymerization reaction, dense-phase material 16 in the reactor includes the seed bed.

In a class of embodiments of the inventive method, a continuity additive ("CA") and a seed bed are pre-loaded into a reactor (e.g., reactor 10) in which a polymerization reaction can be performed. Optionally, a polymerization reaction is then performed in the reactor. In other embodiments of the inventive method, a flow improver, a CA, and a seed bed are pre-loaded into a reactor (e.g., reactor 10) in which a polymerization reaction can be performed. Optionally, a polymerization reaction is then performed in the reactor.

Pre-loading of reactor 10 with a CA (or a CA and a flow improver) and a seed bed in accordance with the invention can significantly improve continuity of a polymerization reaction subsequently performed in the reactor during the reaction's initial stage or stages (before the reaction has stabilized), including by reducing sheeting and fouling. In some embodiments, pre-loading in accordance with the invention is accomplished by loading the seed bed into reactor 10 and then combining a CA (or a combination of a CA and a flow improver) with the seed bed in the reactor before the start of a polymerization reaction in the reactor.

In a class of embodiments, the invention is a method comprising the steps of:

(a) loading a seed bed into reactor 10 (or another reactor in which a polymerization reaction can be performed);

(b) loading a CA, or a combination of a CA and a flow improver, into the reactor; and (c) after steps (a) and (b), performing a polymerization reaction in the reactor. Steps (a) and (b) can be performed either simultaneously or sequentially. Steps (a) and (b) can be and typically are performed with air and moisture present in the reactor. Typically, moisture and air are removed from the reactor (e.g., by performing a drying operation) after steps (a) and (b) but before step (c) to prepare the reactor for performance of the reaction. For example, in some embodiments, moisture and air are removed from the reactor by performing a drying operation.

Pre-loading of reactor 10 with a CA (or a CA and a flow improver) in accordance with the invention, when a seed bed exists in the reactor, can significantly improve continuity of a polymerization reaction subsequently performed in the reactor during the reaction's initial stage or stages (before the reaction has stabilized), including by reducing sheeting and fouling. In some embodiments, pre-loading in accordance with the invention is accomplished by having an existing seed bed in reactor 10 and then combining a CA (or a combination of a CA and a flow improver) with the seed bed in the reactor before the start of a polymerization reaction in the reactor.

In a class of embodiments, the invention is a method comprising the steps of:

(a) when a seed bed is present in a reactor (e.g., a seed bed remaining in reactor 10 from a previous polymerization operation performed in reactor 10), loading a continuity additive ("CA") or a combination of a CA and a flow improver into the reactor; and (b) after step (a), performing a polymerization reaction in the reactor.

Typically, air and moisture are present (with the seed bed) in the reactor during step (a). Typically, the moisture and air are removed from the reactor (e.g., by performing a drying or purging operation) after step (a) but before step (b) to prepare the reactor for performance of the reaction.

In another class of embodiments, the invention is a method comprising the steps of:

(a) loading a seed bed, and either a continuity additive ("CA") or a combination of a CA and a flow improver, into a reactor; and (b) after step (a), performing a polymerization reaction in the reactor.

Typically, air and moisture are present (with the seed bed) in the reactor during step (a). Typically, the moisture and air are removed from the reactor (e.g., by performing a drying or purging operation) after step (a) but before step (b) to prepare the reactor for performance of the reaction.

In a class of preferred embodiments, the CA is loaded into reactor 10 in dry form (e.g., as a powder). Alternatively, the CA is loaded into reactor 10 in liquid or slurry form (e.g., as an oil slurry) or in a mixture of solids, liquids, or at least one solid and at least one liquid. In some embodiments in which a CA is pre-loaded into reactor 10 (or another reactor) in accordance with the invention in slurry form, the CA typically comprises 2%-50% by weight of the slurry (or 5%-35% by weight of the slurry in preferred embodiments, or 10%-30% by weight of the slurry in more preferred embodiments).

To aid delivery of a dry CA to a reactor (e.g., reactor 10) and combination of the dry CA with a seed bed in the reactor, the dry CA can be combined with a flow improver and the combination of CA and flow improver then loaded into the reactor. Alternatively, the CA and flow improver can be sequentially loaded into the reactor, and then mixed together (and mixed with a seed bed) in the reactor after both the CA and flow improver have been separately loaded into the reactor. The improved flow properties of the combined CA and flow improver allow for delivery of the CA as a solid (e.g., to pre-load the reactor with a specific, predetermined amount of CA for smooth start up operation).

In typical embodiments, a specific amount of CA is pre-loaded into reactor 10 based on the weight of a seed bed in (or to be loaded into) the reactor. In various embodiments of the invention, a CA is pre-loaded into reactor 10 (or another reactor) in any of a number of different ways, including by:

pretreatment of a seed bed in the reactor with a flow-aid modified CA (a CA combined with a flow improver);

introduction of the CA with (and during) loading of a seed bed into the reactor;

introduction of the CA during the reactor condition build-up stage after purging is complete;

introduction of the CA directly into the seed bed via a tube located within the seedbed (For example, CA 7 can be pre-loaded into a seed bed in reactor 10 of FIG. 1 via one or more of catalyst support tubes 8. Typically, a total of eight support tubes 8 would extend through the wall of reactor 10, with the outlet end of each within the seed bed. However, only four of tubes 8 are shown in FIG. 1); and introduction of dry CA (that has been pre-weighed into a metal container) into the reactor using pressurized nitrogen.

The CA pre-loaded into a reactor in accordance with the invention can have any composition provided that it will improve continuity of a polymerization reaction subsequently performed in the reactor during at least one initial stage of the reaction (before the reaction has stabilized), including by reducing sheeting and fouling. Examples of CAs suitable for improving continuity of a variety of polymerization reactions are described in above-referenced U.S. Pat. Nos. 6,482,903; 6,660,815; 6,306,984; and 6,300,436. Typically, a CA is not catalytic but is combined with a catalyst (and optionally also with a flow improver) before or after being introduced into the reactor.

Examples of CAs that can be employed in different embodiments of the invention include: aluminum stearate, other metal stearates, Atmer AS 990 (an ethoxylated stearyl amine, available from Ciba Specialty Chemicals Co, Basel, Switzerland), and carboxylate metal salts.

Carboxylate metal salts that may be suitable for use in accordance with the invention as continuity additives (CAs) include any mono- or di- or tri-carboxylic acid salt with a metal portion from the Periodic Table of Elements. Examples include saturated, unsaturated, aliphatic, aromatic or saturated cyclic carboxylic acid salts where the carboxylate ligand has preferably from 2 to 24 carbon atoms, such as acetate, propionate, butyrate, valerate, pivalate, caproate, isobuytlacetate, t-butyl-acetate, caprylate, heptanate, pelargonate, undecanoate, oleate, octoate, palmitate, myristate, margarate, stearate, arachate and tercosanoate. Examples of the metal portion includes a metal from the Periodic Table of Elements selected from the group of Al, Mg, Ca, Sr, Sn, Ti, V, Ba, Zn, Cd, Hg, Mn, Fe, Co, Ni, Pd, Li and Na.

Carboxylate metal salts that may be suitable for use in accordance with the invention as CAs include those represented by the general formula $M(Q)_x(OOCR)_y$, where M is a metal from Groups 1 to 16 and the Lanthanide and Actinide series, preferably from Groups 1 to 7 and 13 to 16 (preferably Groups 2 and 13, and most preferably Group 13); Q is a halogen, hydrogen, or a hydroxy, hydroxide, alkyl, alkoxy, aryloxy, siloxy, silane sulfonate group, or siloxane; R is a hydrocarbyl radical having from 2 to 100 carbon atoms, preferably 4 to 50 carbon atoms; and x is an integer from 0 to 3 and y is an integer from 1 to 4 and the sum of x and y is equal to the valence of the metal. In a preferred embodiment of the above formula, y is an integer from 1 to 3, preferably 1 to 2, especially where M is a Group-13 metal.

Non-limiting examples of R in the above formula include hydrocarbyl radicals having 2 to 100 carbon atoms that include alkyl, aryl, aromatic, aliphatic, cyclic, saturated or unsaturated hydrocarbyl radicals. For example, R can be a hydrocarbyl radical having greater than or equal to 8 carbon atoms (preferably greater than or equal to 17 carbon atoms) or R can be a hydrocarbyl radical having from 17 to 90 carbon atoms (preferably from 17 to 54 carbon atoms).

Non-limiting examples of Q in the above formula include one or more, same or different, hydrocarbon containing group such as alkyl; cycloalkyl, aryl, alkenyl, arylalkyl, arylalkenyl or alkylaryl, alkylsilane, arylsilane, alkylamine, arylamine, alkyl phosphide, alkoxy having from 1 to 30 carbon atoms. The hydrocarbon containing group may be linear, branched, or even substituted. For example, Q can be an inorganic group such as a halide, sulfate or phosphate.

In other examples, a carboxylate metal salt that may be suitable for use as a CA in accordance with the invention is an aluminum carboxylate. For example, it can be one of the aluminum mono-, di- and tri-stearates, aluminum octoates, oleates and cyclohexylbutyrates. For example, the carboxylate metal salt can be $(CH_3(CH_2)_{16}COO)_3Al$, an aluminum tri-stearate (preferred melting point 115° C.), $(CH_3(CH_2)_{16}COO)_2$-A-OH, an aluminum di-stearate (preferred melting point 145° C.), or $CH_3(CH_2)_{16}COO\text{—}Al\text{—}(OH)_2$, an aluminum mono-stearate (preferred melting point 155° C.).

Commercially available examples of carboxylate metal salts include Crompton Aluminum Stearate #18, Crompton Aluminum Stearate #22, Crompton Aluminum Stearate #132 and Crompton Aluminum Stearate EA Food Grade, all available from Crompton Corporation, of Memphis, Tenn.

For some applications, a carboxylate metal salt employed as a CA in accordance with the invention has a melting point from about 30° C. to about 250° C. (preferably from about 100° C. to about 200° C.). For some applications, the carboxylate metal salt employed as a CA in accordance with the invention is an aluminum stearate having a melting point in the range of from about 135° C. to about 65° C. For typical applications, the carboxylate metal salt employed as a CA has a melting point greater than the polymerization temperature in the reactor.

Other examples of carboxylate metal salts that may be suitable for use as continuity additives in accordance with the invention include titanium stearates, tin stearates, calcium stearates, zinc stearates, boron stearate and strontium stearates.

In some embodiments of the invention, a carboxylate metal salt is combined (for use as a continuity additive to be pre-loaded into a reactor) with an antistatic agent such as a fatty amine, for example, Atmer AS 990/2 zinc additive, a blend of ethoxylated stearyl amine and zinc stearate, or Atmer AS 990/3, a blend of ethoxylated stearyl amine, zinc stearate and octadecyl-3,5-di-tert-butyl-4-hydroxyhydrocinnamate. Both the AS 990/2 and 990/3 blends are available from Crompton Corporation of Memphis, Tenn.

An example of a flow improver, that can be combined with a CA (e.g., a carboxylate metal salt) in dry form and then pre-loaded in a reactor in accordance with a class of embodiments of the invention for improving continuity of a subsequent olefin polymerization process in the presence of a catalyst composition including a catalyst system (e.g., a supported bulky ligand metallocene-type catalyst system), is a colloidal particulate material (e.g., Snowtex colloidal silica, available from Nissan Chemical Industries, Tokyo, Japan, or Aerosil colloidal silica, available from Degussa, or another colloidal silica). Other examples of a flow improver for use in accordance with the invention are a colloidal silica (e.g., Cabosil, available from Cabot), a fumed silica, a syloid, and alumina.

Another example of a substance that can be employed as a CA (in accordance with some embodiments of the invention) is an antistatic agent of any of the types described in U.S. Pat. No. 6,245,868, issued Jun. 12, 2001. As described in U.S. Pat. No. 6,245,868, an antistatic agent is any organic compound containing at least one electron rich heteroatom from Groups IV, V and/or VI and a hydrocarbyl moiety. Non-limiting examples of typical heteroatoms include silicon, oxygen, nitrogen, phosphorus, and sulfur. The antistatic agent should also contain at least one active hydrogen atom attached to the heteroatom. In some embodiments, it is preferable that the hydrocarbyl moiety have a molecular weight sufficient to give it solubility in typical hydrocarbon solvents, such as, for example a cyclic aliphatic or aromatic hydrocarbon, for example toluene.

Examples of antistatic agents that can be employed as CAs in accordance with some embodiments of the invention are represented by the formula, $R_mXR'_n$, where R is a branched or straight chain hydrocarbyl group or substituted hydrocarbyl group or groups having one or more carbon atoms, R' is an alkyl hydroxy group such as —$CH_2CH_2OH$, X is at least one heteroatom (an O, N, P or S atom or a combination thereof), and n is such that the formula has no net charge. Non limiting examples are the following general structures with R being a hydrocarbyl group are: $RNH_2$, $R_2NH$, $(R'C(OH)_nR")NH_2$, $(R'C(OH)_nR")_2NH$, $RCONH_2$, $RCONHR$, $RN(ROH)_2$, $RCO_2H$, $RC(O)NROH$, $RC(S)OH$, and $R_2PO_2H$. These compounds include amines, alcohols, phenols, thiols, silanols, diols, polyols, glycols, acids, and ethers.

Figure 4:
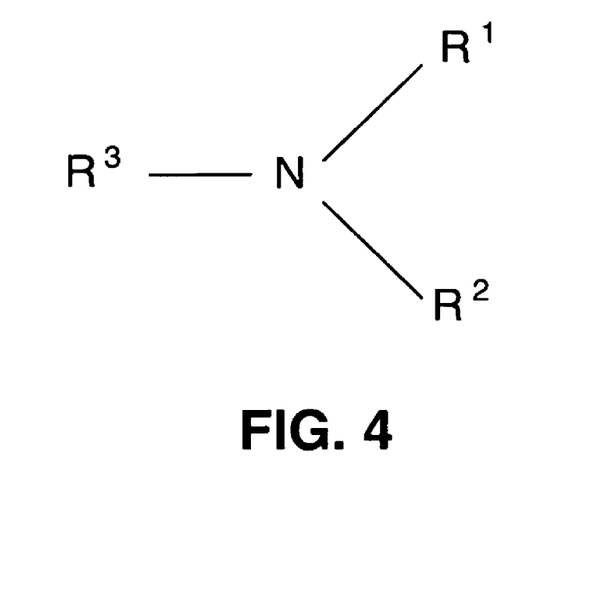
FIG. 4 is a formula identifying a class of antistatic agents that can be employed as continuity additives in accordance with some embodiments of the invention.

Other examples of antistatic agents that can be employed as CAs in accordance with some embodiments of the invention are expressed by the formula shown in FIG. 4, where $R^3$ is hydrogen or a branched or preferably a straight chain alkyl group having 1 to 50 carbon atoms. $R^1$ and $R^2$ can be the same or different and can be the same as $R^3$ or contain another heteroatom (e.g., O, N, P or S).

Figure 5:
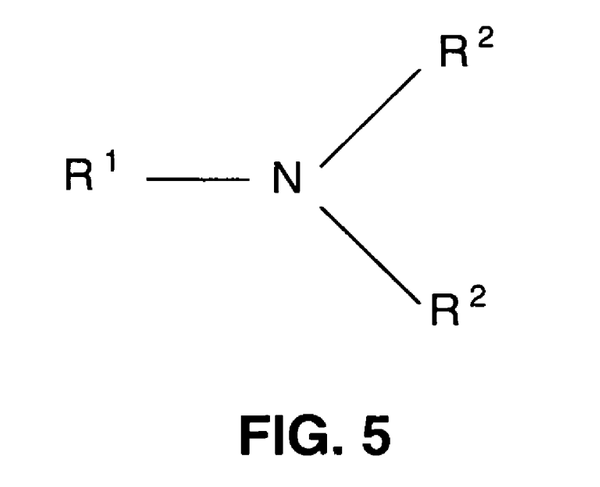
FIG. 5 is a formula identifying a class of antistatic agents that can be employed as continuity additives in accordance with some embodiments of the invention.

Other examples of antistatic agents that can be employed as CAs in accordance with some embodiments of the invention are expressed by the formula shown in FIG. 5 for a hydroxy containing alkyl tertiary amine, where $R^1$ is hydrogen or a linear or branched alkyl group of from 1 to 50 carbon atoms (preferably greater than 12 carbon atoms), and $R^2$ can be a hydroxy group such a $(CH_2)_xOH$ radical, where x is an integer from 1 to 50 (preferably from 2 to 25).

Other examples of antistatic agents that can be employed as CAs in accordance with some embodiments of the invention are quaternary ammonium compounds, and hydrocarbyl sulfates or phosphates. Tertiary amines, ethoxylated amines and polyether compounds are other examples of antistatic agents that can be employed as CAs in accordance with some embodiments of the invention. Antistatic agents employed as CAs in accordance with the invention can be synthetically derived or otherwise.

When a CA has been pre-loaded in reactor 10 (or another reactor) in accordance with the invention, one or more sensors (e.g., acoustic carryover probes or static carryover probes) can be used to monitor the presence of the CA in the reactor's cycle gas loop. In response to the output of such a sensor, the operator can determine whether more CA should be loaded into the reactor.

In some embodiments, a CA is pre-loaded into a reactor to cause the CA to be present in the reactor in a concentration (relative to the weight of a seed bed also present in the reactor) in one of the following ranges: 2 ppm by weight to 3% by weight, or preferably 5 ppm to 1000 ppm, or more preferably 5 ppm to 200 ppm, or more preferably 10 ppm to 100 ppm, or most preferably 15 ppm to 50 ppm by weight.

Reactor 10 can be implemented as a mLLDPE (metallocene-catalyzed, linear low-density polyethylene) reactor.

Figure 2:
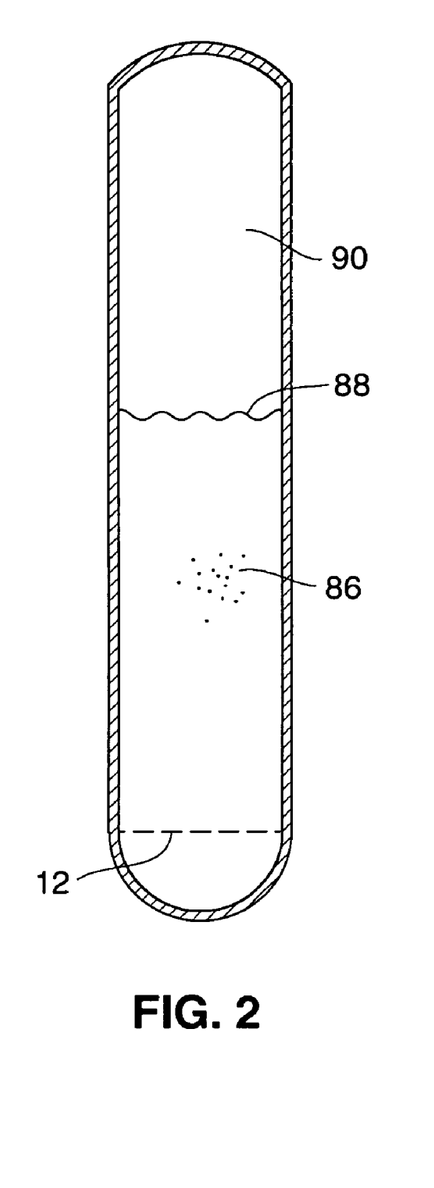
FIG. 2 is a simplified cross-sectional view of another fluidized bed reactor which can be pre-loaded in accordance with the invention.

FIG. 2 is a simplified cross-sectional view of another fluidized bed reactor which can be pre-loaded in accordance with the invention. The FIG. 2 reactor has a cylindrical (straight) section between its bottom end and its top section, and a distributor plate 12 within the straight section. In operation, dense-phase surface 88 is the boundary between lean phase material present within the reactor (above dense-phase surface 88) and dense-phase material 86 within the reactor (in the volume bounded by the straight section, plate 12, and surface 88).

Figure 3:
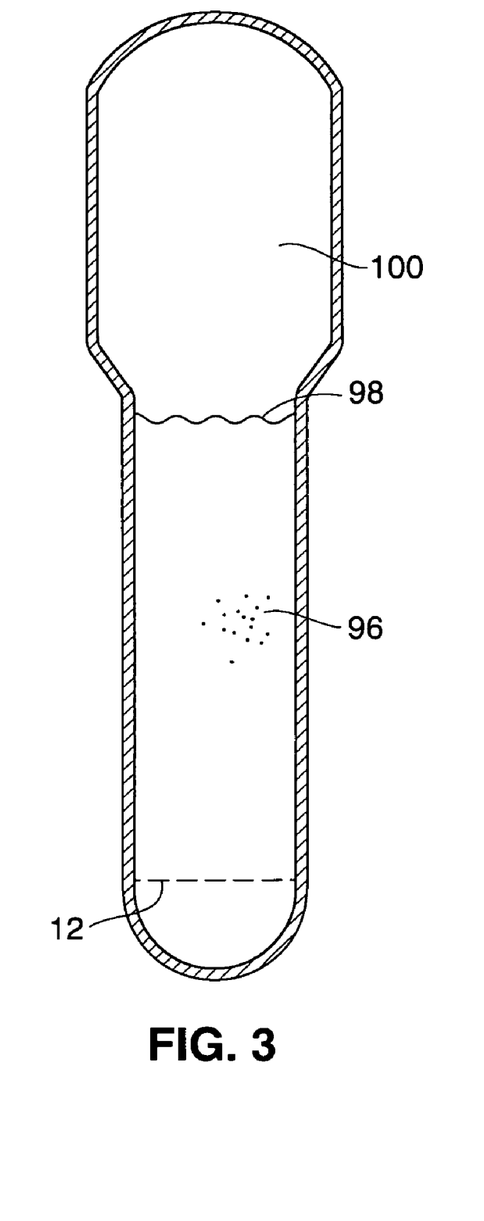
FIG. 3 is a simplified cross-sectional view of another fluidized bed reactor which can be pre-loaded in accordance with the invention.

FIG. 3 is a simplified cross-sectional view of another fluidized bed reactor which can be pre-loaded in accordance in accordance with the invention. The FIG. 3 reactor has a cylindrical (straight) section between its bottom end and its top section, and a distributor plate 12 within the straight section. The diameter of each horizontal cross-section of the top section is greater than the diameter of the straight section, but the top section of the FIG. 3 reactor is shaped differently than the top section of reactor 10 of FIG. 1. In operation of the FIG. 3 reactor, dense-phase surface 98 is the boundary between lean phase material present within the reactor (above dense-phase surface 98) and dense-phase material 96 within the reactor (in the volume bounded by the straight section, plate 12, and surface 98).

We next describe examples of commercial-scale reactions (e.g., commercial-scale, gas-phase fluidized-bed polymerization reactions) that can be performed in a reactor that has been pre-loaded in accordance with the invention. Some such reactions can occur in a reactor having the geometry of reactor 10 of FIG. 1, or the geometry of the FIG. 2 or FIG. 3 reactor. In different embodiments of the invention, any of a variety of different reactors is pre-loaded and optionally also then operated to perform a polymerization reaction in accordance with the invention.

In some embodiments, a continuous gas phase fluidized bed reactor is pre-loaded in accordance with the invention before it operates to perform polymerization as follows. The fluidized bed is made up of polymer granules. Liquid or gaseous feed streams of the primary monomer and hydrogen together with liquid or gaseous comonomer are combined and introduced into the recycle gas line upstream of the fluidized bed. For example, the primary monomer is ethylene and the comonomer is hexene. The individual flow rates of ethylene, hydrogen and comonomer are controlled to maintain fixed composition targets. The ethylene concentration is controlled to maintain a constant ethylene partial pressure. The hydrogen is controlled to maintain a constant hydrogen to ethylene mole ratio. The hexene is controlled to maintain a constant hexene to ethylene mole ratio. The concentration of all gases is measured by an on-line gas chromatograph to ensure relatively constant composition in the recycle gas stream. A solid or liquid catalyst is injected directly into the fluidized bed using purified nitrogen as a carrier. Its rate is adjusted to maintain a constant production rate. The reacting bed of growing polymer particles is maintained in a fluidized state by the continuous flow of the make up feed and recycle gas through the reaction zone. In some implementations, a superficial gas velocity of 1-3 ft/sec is used to achieve this, and the reactor is operated at a total pressure of 300 psig. To maintain a constant reactor temperature, the temperature of the recycle gas is continuously adjusted up or down to accommodate any changes in the rate of heat generation due to the polymerization. The fluidized bed is maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

In other embodiments, a reactor is pre-loaded in accordance with the invention and then operated to perform polymerization using any of a variety of different processes (e.g., solution, slurry, or gas phase processes). For example, the reactor can be a fluidized bed reactor that is operated to produce polyolefin polymers by a gas phase polymerization process. This type of reactor and means for operating such a reactor are well known. In operation of such reactors to perform gas phase polymerization processes, the polymerization medium can be mechanically agitated or fluidized by the continuous flow of the gaseous monomer and diluent.

In some embodiments, a polymerization reaction is performed in a reactor that has been pre-loaded in accordance with the invention. The reaction can be a continuous gas phase process (e.g., a fluid bed process). A fluidized bed reactor for performing such a process typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. This method of operation is referred to as "condensed mode." A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. The gas is compressed in a compressor, passed through a heat exchanger wherein the heat of polymerization is removed, and then returned to the reaction zone.

The reactor temperature of the fluid bed process can range from 30° C. or 40° C. or 50° C. to 90° C. or 100° C. or 110° C. or 120° C. or 150° C. In general, the reactor temperature is operated at the highest temperature that is feasible taking into account the sintering temperature of the polymer product within the reactor. The polymerization temperature or reaction temperature typically must be below the melting or "sintering" temperature of the polymer to be formed. Thus, the upper temperature limit in one embodiment is the melting temperature of the polyolefin produced in the reactor.

In other embodiments, a reactor that has been pre-loaded in accordance with the invention is then operated to effect polymerization by a slurry polymerization process. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which monomer and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

In other embodiments, a reactor that has been pre-loaded in accordance with the invention is operated to perform particle form polymerization, or a slurry process in which the temperature is kept below the temperature at which the polymer goes into solution. In other embodiments, a reactor that has been pre-loaded in accordance with the invention is a loop reactor or one of a plurality of stirred reactors in series, parallel, or combinations thereof. Non-limiting examples of slurry processes include continuous loop or stirred tank processes.

A reactor that has been pre-loaded in accordance with some embodiments of the invention can be operated to produce homopolymers of olefins, e.g., ethylene, and/or copolymers, terpolymers, and the like, of olefins, particularly ethylene, and at least one other olefin. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. A reactor that has been pre-loaded in accordance with the invention can produce polyethylenes. Such polyethylenes can be homopolymers of ethylene and interpolymers of ethylene and at least one α-olefin wherein the ethylene content is at least about 50% by weight of the total monomers involved. Exemplary olefins that may be utilized in embodiments of the invention are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 200 atmospheres pressure in yet another embodiment, and up to 100 atmospheres in yet another embodiment, up to 50 atmospheres in yet another embodiment, and up to 30 atmospheres in yet another embodiment.

Hydrogen gas is often used in olefin polymerization to control the final properties of the polyolefin. For some types of catalyst systems, it is known that increasing concentrations (partial pressures) of hydrogen increase the melt flow (MF) and/or melt index (MI) of the polyolefin generated. The MF or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in some polymerization processes is an amount necessary to achieve the desired MF or MI of the final polyolefin resin. In one embodiment, the mole ratio of hydrogen to total monomer ($H_2$:monomer) is greater than 0.00001. The mole ratio is greater than 0.0005 in another embodiment, greater than 0.001 in yet another embodiment, less than 10 in yet another embodiment, less than 5 in yet another embodiment, less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 10 ppm in one embodiment, or up to 100 or 3000 or 4000 or 5000 ppm in other embodiments, or between 10 ppm and 5000 ppm in yet another embodiment, or between 500 ppm and 2000 ppm in another embodiment.

A reactor that is pre-loadable in accordance with some embodiments of the invention is an element of a staged reactor employing two or more reactors in series, wherein one reactor may produce, for example, a high molecular weight component and another reactor may produce a low molecular weight component.

A reactor that has been pre-loaded in accordance with some embodiments of the invention can be operated to implement a slurry or gas phase process in the presence of a bulky ligand metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components.

A reactor that has been pre-loaded in accordance with some embodiments of the invention can be operated to perform a reaction that employs one or more catalysts combined with up to 10 wt % of a metal-fatty acid compound, such as, for example, an aluminum stearate, based upon the weight of the catalyst system (or its components). Other metals that may be suitable include other Group 2 and Group 5-13 metals. In other embodiments, a solution of the metal-fatty acid compound is fed into the reactor. In other embodiments, the metal-fatty acid compound is mixed with the catalyst and fed into the reactor separately. These agents may be mixed with the catalyst or may be fed into the reactor in a solution or a slurry with or without the catalyst system or its components.

In a reactor that has been pre-loaded in accordance with some embodiments of the invention, supported catalyst(s) can be combined with activators and can be combined by tumbling and/or other suitable means, with up to 2.5 wt % (by weight of the catalyst composition) of an antistatic agent, such as an ethoxylated or methoxylated amine, an example of which is Atmer AS-990 (Ciba Specialty Chemicals, Basel, Switzerland). Other antistatic compositions include the Octastat family of compounds, more specifically Octastat 2000, 3000, and 5000.

Metal fatty acids and antistatic agents can be added as either solid slurries or solutions as separate feeds into the reactor. One advantage of this method of addition is that it permits on-line adjustment of the level of the additive.

Examples of polymers that can be produced in accordance with the invention include the following: homopolymers and copolymers of C2-C18 alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; and polychloroprene; norbornene homopolymers and copolymers with one or more C2-C18 alpha olefin; terpolymers of one or more C2-C18 alpha olefins with a diene.

Monomers that can be present in a reactor that has been pre-loaded in accordance with the invention include one or more of: C2-C18 alpha olefins such as ethylene, propylene, and optionally at least one diene, for example, hexadiene, dicyclopentadiene, octadiene including methyloctadiene (e.g., 1-methyl-1,6-octadiene and 7-methyl-1,6-octadiene), norbornadiene, and ethylidene norbornene; and readily condensable monomers, for example, isoprene, styrene, butadiene, isobutylene, chloroprene, acrylonitrile, cyclic olefins such as norbornenes.

Fluidized bed polymerization (e.g., mechanically stirred and/or gas fluidized) reactions can be performed in some reactors that have been pre-loaded in accordance with the invention. Such a reaction can be any type of fluidized polymerization reaction and can be carried out in a single reactor or multiple reactors such as two or more reactors in series.

In various embodiments, any of many different types of polymerization catalysts can be used in a polymerization process performed in a reactor that has been pre-loaded in accordance with the invention. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts are used with cocatalysts and promoters well known in the art. Typically these are alkylaluminums, alkylaluminum halides, alkylaluminum hydrides, as well as aluminoxanes. For illustrative purposes only, examples of suitable catalysts include Ziegler-Natta catalysts, Chromium based catalysts, Vanadium based catalysts (e.g., vanadium oxychloride and vanadium acetylacetonate), Metallocene catalysts and other single-site or single-site-like catalysts, Cationic forms of metal halides (e.g., aluminum trihalides), anionic initiators (e.g., butyl lithiums), Cobalt catalysts and mixtures thereof, Nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium.

In various embodiments, a polymerization reaction performed in a reactor that has been pre-loaded in accordance with the invention can employ other additives, such as (for example) inert particulate particles.

It should be understood that the term "includes" in the claims denotes "is or includes."

It should be understood that while some embodiments of the present invention are illustrated and described herein, the invention is not to be limited to the specific embodiments described and shown.

What is claimed is:

1. A method for preparing a reactor for performance of a polymerization reaction in the reactor, said method including the steps of:
   (a) loading a seed bed into the reactor; and
   (b) pre-loading at least one continuity additive into the reactor, wherein the continuity additive comprises at least one of a metal stearate or carboxylate metal salt.

2. The method of claim 1, also including the step of:
   (c) after steps (a) and (b), performing the polymerization reaction in the reactor including by performing at least an initial stage of the reaction in the presence of the continuity additive.

3. The method of claim 2, wherein the reaction is an olefin polymerization reaction.

4. The method of claim 1, wherein steps (a) and (b) are performed sequentially.

5. The method of claim 4, wherein the reactor includes at least one tube, the tube is positioned and configured for introducing a substance into the reactor through said tube, step (a) is performed before step (b), and step (b) includes the step of introducing the continuity additive into the seed bed through the tube.

6. The method of claim 1, wherein steps (a) and (b) are performed simultaneously.

7. The method of claim 1, also including the steps of:
   (c) after steps (a) and (b), removing moisture and air from the reactor; and
   (d) after step (c), performing the polymerization reaction in the reactor including by performing at least an initial stage of the reaction in the presence of the continuity additive.

8. The method of claim 1, also including the steps of:
   (c) after steps (a) and (b), drying the seed bed and the continuity additive, thereby removing moisture and air from the reactor; and
   (d) after step (c), performing the polymerization reaction in the reactor including by performing at least an initial stage of the reaction in the presence of the continuity additive.

9. The method of claim 1, also including the step of:
   (c) pre-loading at least one flow improver into the reactor.

10. The method of claim 9, also including the step of:
    after steps (a), (b), and (c), performing the polymerization reaction in the reactor including by performing at least an initial stage of the reaction in the presence of the continuity additive and the flow improver.

11. The method of claim 9, wherein the continuity additive is a dry continuity additive, and also including the step of:

before performing steps (b) and (c), combining the dry continuity additive with the flow improver, and then performing steps (b) and (c) by pre-loading a combination of the continuity additive and the flow improver into the reactor.

12. The method of claim 11, wherein the continuity additive includes a carboxylate metal salt and the flow improver includes a colloidal particulate material.

13. The method of claim 12, wherein the reaction is an olefin polymerization reaction.

14. The method of claim 11, wherein the continuity additive includes a carboxylate metal salt and the flow improver includes a colloidal silica.

15. The method of claim 14, wherein the reaction is an olefin polymerization reaction.

16. The method of claim 11, wherein the continuity additive includes a carboxylate metal salt and the flow improver includes a fumed silica.

17. The method of claim 16, wherein the reaction is an olefin polymerization reaction.

18. The method of claim 11, wherein the flow improver includes alumina.

19. The method of claim 18, wherein the reaction is an olefin polymerization reaction.

20. The method of claim 1, wherein the continuity additive is pre-loaded in dry form.

21. The method of claim 1, wherein the continuity additive is pre-loaded as a powder.

22. The method of claim 1, wherein the continuity additive is pre-loaded in liquid form.

23. The method of claim 1, wherein the continuity additive is pre-loaded as a slurry.

24. The method of claim 1, wherein the metal stearate is aluminum stearate.

25. The method of claim 1, wherein the carboxylate metal salt is one of a mono-carboxylic acid salt, a di-carboxylic acid salt, and a tri-carboxylic acid salt.

26. The method of claim 1, wherein the carboxylate metal salt is represented by the formula $M(Q)_x(OOCR)_y$, where M is a metal from Groups 1 to 16 and the Lanthanide and Actinide series, Q is one of hydrogen, a halogen, a hydroxy group, a hydroxide group, an alkyl group, an alkoxy group, an aryloxy group, a siloxy group, a silane group, a sulfonate group, and siloxane, R is a hydrocarbyl radical having from 2 to 100 carbon atoms, x is an integer from 0 to 3 inclusive, y is an integer from 1 to 4 inclusive, and x+y=z, where z is the valence of the metal.

27. The method of claim 1, wherein the carboxylate metal salt is an aluminum carboxylate.

28. The method of claim 1, wherein the continuity additive includes an antistatic agent.

29. The method of claim 28, wherein the antistatic agent is represented by the formula, $R_mXR'_n$, where R is one of a branched chain hydrocarbyl group, a straight chain hydrocarbyl group, and a substituted hydrocarbyl group having at least one carbon atom, R' is an alkyl hydroxy group, X is at least one heteroatom, and n is such that the formula has no net charge.

30. The method of claim 1, also including the step of:

(c) after steps (a) and (b), performing the polymerization reaction in the reactor including by performing at least an initial stage of the reaction in the presence of the continuity additive, and wherein the carboxylate metal salt has a melting point greater than the temperature in the reactor during the polymerization reaction.

31. The method of claim 1, wherein the reaction is an olefin polymerization reaction.

32. A method for preparing a reactor for performance of a polymerization reaction in the reactor, said method including the steps of:

(a) preparing treated seed bed material by combining seed bed material with at least one continuity additive, wherein the continuity additive comprises at least one of a metal stearate, ethyoxylated stearyl amine, or carboxylate metal salt; and (b) pre-loading the treated seed bed material into the reactor.

33. The method of claim 32, also including the step of:

(c) after steps (a) and (b), performing the polymerization reaction in the reactor including by performing at least an initial stage of the reaction in the presence of the continuity additive.

34. The method of claim 33, wherein the reaction is an olefin polymerization reaction.

35. The method of claim 32, wherein the carboxylate metal salt is one of a mono-carboxylic acid salt, a di-carboxylic acid salt, and a tri-carboxylic acid salt.

36. The method of claim 32, wherein the carboxylate metal salt is represented by the formula $M(Q)_x(OOCR)_y$, where M is a metal from Groups 1 to 16 and the Lanthanide and Actinide series, Q is one of hydrogen, a halogen, a hydroxy group, a hydroxide group, an alkyl group, an alkoxy group, an aryloxy group, a siloxy group, a silane group, a sulfonate group, and siloxane, R is a hydrocarbyl radical having from 2 to 100 carbon atoms, x is an integer from 0 to 3 inclusive, y is an integer from 1 to 4 inclusive, and x+y=z, where z is the valence of the metal.

37. The method of claim 32, wherein the continuity additive includes an antistatic agent.

38. The method of claim 37, wherein the antistatic agent is represented by the formula, $R_mXR'_n$, where R is one of a branched chain hydrocarbyl group, a straight chain hydrocarbyl group, and a substituted hydrocarbyl group having at least one carbon atom, R' is an alkyl hydroxy group, X is at least one heteroatom, and n is such that the formula has no net charge.

39. A method for preparing a reactor, having a seed bed present therein, for performance of a polymerization reaction in the reactor, said method comprising the step of:

(a) while the seed bed is present in the reactor, loading at least one continuity additive into the reactor before performing the polymerization reaction in said reactor, wherein the continuity additive comprises at least one of a metal stearate or carboxylate metal salt.

40. The method of claim 39, also including the step of:

(b) after step (a), performing the polymerization reaction in the reactor including by performing at least an initial stage of said reaction in the presence of the continuity additive.

41. The method of claim 40, wherein air and moisture are present with the seed bed in the reactor during step (a), and also including the step of:

(c) removing at least some of the moisture and air from the reactor after step (a) but before step (b) in preparation for performing the polymerization reaction.

42. The method of claim 40, wherein the reaction is an olefin polymerization reaction.

43. The method of claim 42, wherein the reactor includes at least one tube, the tube is positioned and configured for introducing a substance into the reactor through said tube, and step (a) includes the step of introducing the continuity additive into the seed bed through the tube.

44. The method of claim 40, also including the step of:
(c) after step (a) but before step (b), purging reactants from a previous polymerization reaction from the reactor.

45. The method of claim 39, also including the step of:
(b) pre-loading at least one flow improver into the reactor before performing the polymerization reaction in said reactor.

46. The method of claim 45, also including the step of:
(c) after steps (a) and (b), performing the polymerization reaction in the reactor including by performing at least an initial stage of the reaction in the presence of the continuity additive and the flow improver.

47. The method of claim 46, wherein the continuity additive is a dry continuity additive, and also including the step of:
before performing steps (a) and (b), combining the dry continuity additive with the flow improver, and then performing steps (a) and (b) by pre-loading a combination of the continuity additive and the flow improver into the reactor.

48. The method of claim 46, wherein the reaction is an olefin polymerization reaction.

49. The method of claim 45, wherein the continuity additive includes a carboxylate metal salt and the flow improver includes a colloidal particulate material.

50. The method of claim 45, wherein the continuity additive includes a carboxylate metal salt and the flow improver includes a colloidal silica.

51. The method of claim 45, wherein the continuity additive includes a carboxylate metal salt and the flow improver includes a fumed silica.

* * * * *